(No Model.)

W. H. GANTS.
VALVE FOR WATER CLOSETS AND OTHER RECEPTACLES.

No. 313,314. Patented Mar. 3, 1885.

Witnesses:
Geo. H. Strong.

Inventor,
W. H. Gants
By Dewey & Co.
Attorney

United States Patent Office.

WILLIAM H. GANTS, OF SAN FRANCISCO, CALIFORNIA, ASSIGNOR OF ONE-HALF TO GEORGE E. HERRICK, OF SAME PLACE.

VALVE FOR WATER-CLOSETS AND OTHER RECEPTACLES.

SPECIFICATION forming part of Letters Patent No. 313,314, dated March 3, 1885.

Application filed March 1, 1884. (No model.)

*To all whom it may concern:*

Be it known that I, WILLIAM H. GANTS, of the city and county of San Francisco, and State of California, have invented an Improvement in Valves for Water-Closets and other Receptacles; and I hereby declare the following to be a full, clear, and exact description thereof.

My invention relates to a new and useful valve for admitting and checking a flow of water to a water-closet or other device or receptacle; and it consists in the combination of devices hereinafter set forth and claimed.

Figure 1:
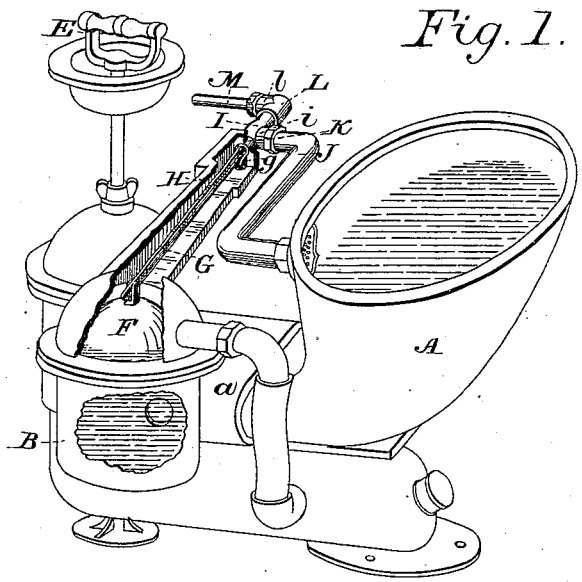
Figure 2:
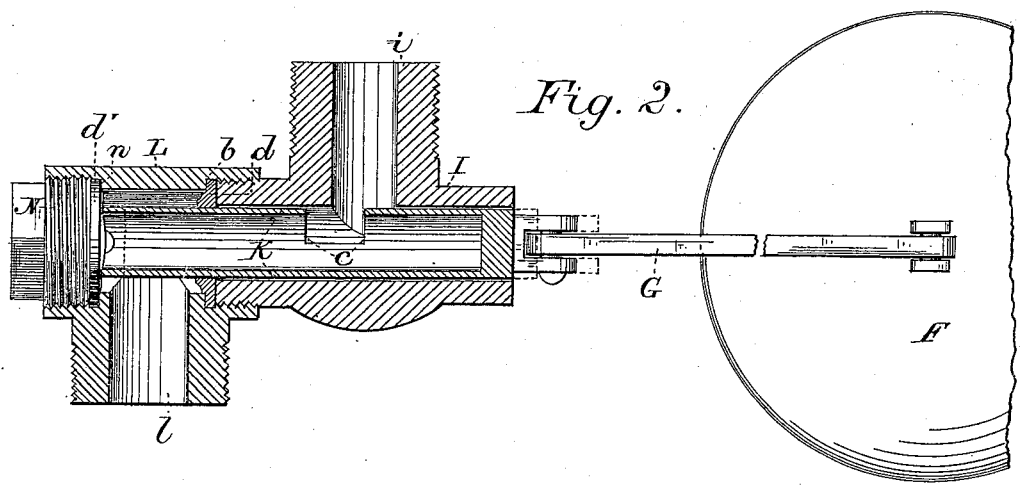
Figure 3:
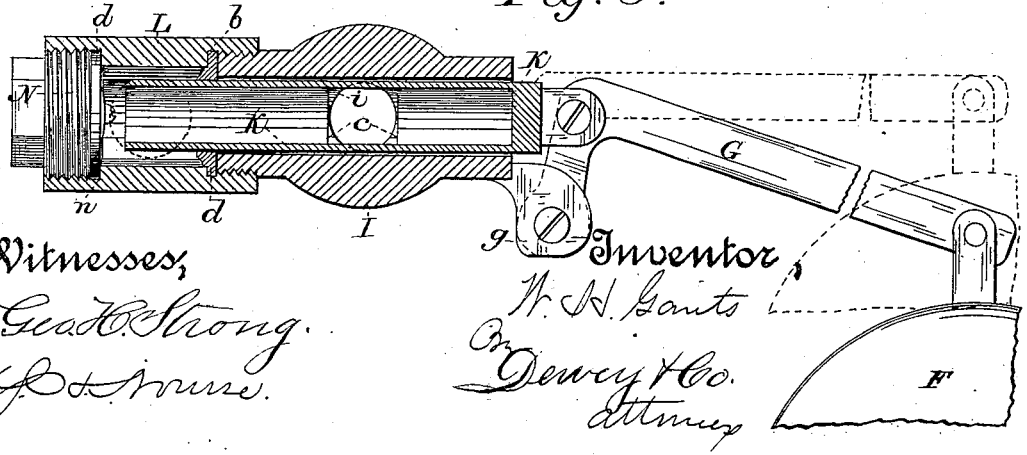

Referring to the accompanying drawings, Figure 1 is a perspective view of my valve, showing its application to a water-closet. Fig. 2 is a horizontal section on an enlarged scale, showing the valve-tube K forced in. Fig. 3 is a vertical longitudinal section showing the valve-tube K forced out.

My invention, while applicable to other devices and receptacles and to other forms of water-closets than the one with which in the drawings I show it connected, is specially useful in this, in which the valve rod is dependent for its operation upon a float.

It is the object of my invention to so relieve the valve of pressure that it can be easily closed and held there by the float mechanism.

A is the bowl of the closet, connected suitably by its pipe *a* with the hermetically-sealed float-case B, the water from which and from the bowl is drawn out by the action of a plunger on the lower end of handle E.

The plunger is adapted to open and close the discharge. When open, the water from both bowl and float-case passes off. When closed, it backs up in both until by its action on the float, as I shall describe, it shuts off the supply.

Inside the float-case is a float, F, with the upper end of which is connected the valve rod or lever G.

H is an extension of the float-chamber, in which the valve-rod is confined. At its outer end is the valve mechanism, which forms the subject-matter of my application.

I is a short T-pipe, on the leg *i* of which the pipe J is screwed, which supplies water to the bowl.

Through the arms of pipe I passes the valve-tube K, accurately fitted therein, though adapted to slide back and forth. The outer end of this valve-tube is closed up solid, and has pivoted to it the valve-rod G, which is an angled rod of elbow shape, being pivoted by its end to a slotted ear, *g*, on the pipe I, and by its angle to the valve-tube. In the valve-tube is made a port, *c*, which communicates with the leg *i* of the pipe I, whereby the water is supplied to pipe J. The inner end of the valve-tube is open.

L is another short T-pipe, on the leg *l* of which the pipe M from the water-source is screwed. Both arms of this pipe are internally threaded, and it is screwed onto the externally-threaded arm of pipe I up to a shoulder or seat, *b*, made in pipe L, and the joint is made water-tight by an intervening washer, *d*. This closes one end of pipe L; the other end is closed by a nut, N, screwed in up to a shoulder, *n*, formed therein, the joint being made water-tight by a washer, *d'*. Against this washer the open end of the valve-tube K is seated when forced in.

The operation of my valve is as follows: When the handle E is drawn up and the water from the float-case B passes off, the float pulls down on the valve-rod and partially withdraws the valve-tube K, so that its open end is free of its seat. The water from pipe M, which is full-head on all the time, then passes into the pipe L, and through the open end of the valve-tube, and out through its port *c* into the bowl. The water in the bowl then passing into the float-case when the handle E is allowed to fall raises the float and pushes up on the valve-rod, causing it to force the valve-tube in again to seat its open end against the washer *d'*, whereby the supply from pipe M is checked.

It will be observed that when the valve-tube is closed the only pressure of the water is against its side, and when opened the only pressure or resistance it offers to the valve is against its edge, which being thin reduces the pressure to almost nothing, whereby it may easily be forced back to its seat. This readiness or ease with which the valve-tube is moved enables me to get the fulcrum and power close together on the valve-rod, and to operate it by the float.

I am aware that heretofore valves having a sliding motion have been constructed with an open end and a port for the exit of the water, and that these valves have been operated by a float attached to a lever or arm. This construction I therefore do not broadly claim; but

What I claim, and desire to secure by Letters Patent, is—

1. A valve for admitting and checking a flow of water to a water-closet or other device or receptacle, consisting of the tube K, having an open and closed end, and a side port, $c$, the T-pipe I, in which said tube is seated, and the T-pipe L, by which it is loosely encircled, said pipes being connected with the water-pipes J M, as described, the nut N in the end of the pipe L, against which the open end of the tube K is adapted to be forced to close it, and the means, as set forth, for reciprocating the tube K to seat its end against the nut N or withdraw it therefrom, substantially as herein described.

2. A valve mechanism for admitting and checking a flow of water to a water-closet or other device or receptacle, consisting of the T-pipe I, the T-pipe L, having shoulders $b\,n$, the end plug, N, and washers $d\,d'$, by which the ends of pipe L are rendered water-tight, the inner valve-tube, K, having an open inner end, a closed projecting end, and a port, $c$, and the elbow rod or lever G, pivoted to the pipe I and to the projecting end of the valve-tube, and the vertically-moving float F on the end of the rod G, all arranged and operating substantially as herein described.

In witness whereof I have hereunto set my hand.

WILLIAM H. GANTS.

Witnesses:
C. D. COLE,
J. H. BLOOD.